A. L. HARRELL.
MOTOR.
APPLICATION FILED JUNE 7, 1920.

1,384,256.

Patented July 12, 1921.

Inventor
A. L. Harrell.
By Fred P. Goin
Attorney

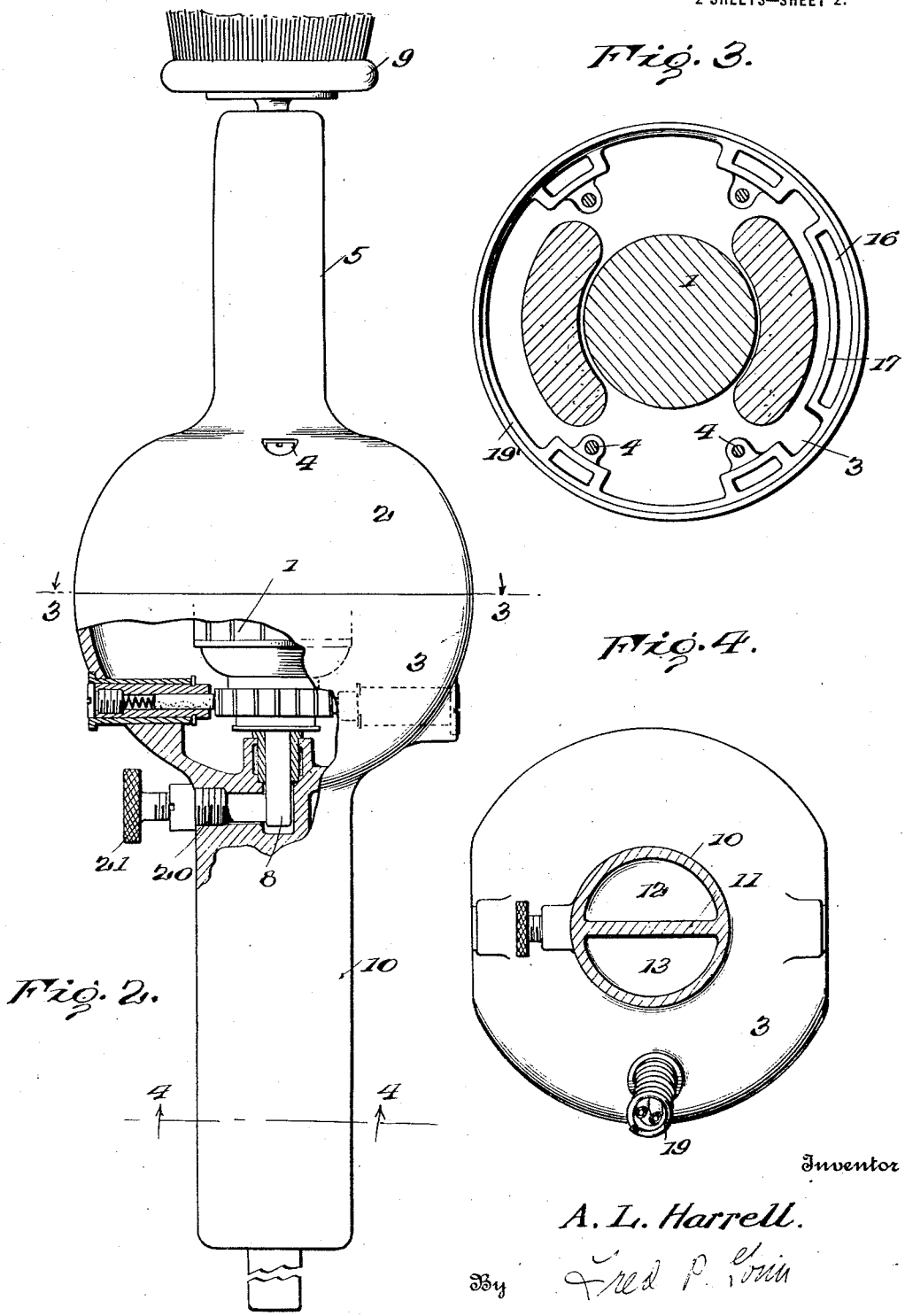

UNITED STATES PATENT OFFICE.

ANNIE L. HARRELL, OF SEATTLE, WASHINGTON.

MOTOR.

1,384,256.

Specification of Letters Patent.  Patented July 12, 1921.

Application filed June 7, 1920. Serial No. 387,105.

*To all whom it may concern:*

Be it known that Mrs. ANNIE L. HARRELL, a citizen of the United States, and residing at Seattle, in the county of King and State of Washington, has invented certain new and useful Improvements in Motors, of which the following is a specification.

This invention relates to an improvement in portable motors of the hand type, wherein the motor is directly connected to a suitable implement for operating on or in other material.

It is of importance in small motors of this type that the motor be kept comparatively cool in operation and that it also be effectively protected against the entrance of water, dust or other material while in use. The present invention is directed to providing a motor of this type, which is effectively cooled while in use, and at the same time thoroughly protected against the admission of water, dust, dirt or the like In the drawings:

Fig. 2 is an elevation of the same.

Fig. 3 is a section on line 3—3 of Fig. 2.

Fig. 4 is a section on line 4—4 of Fig. 2.

Figure 1:
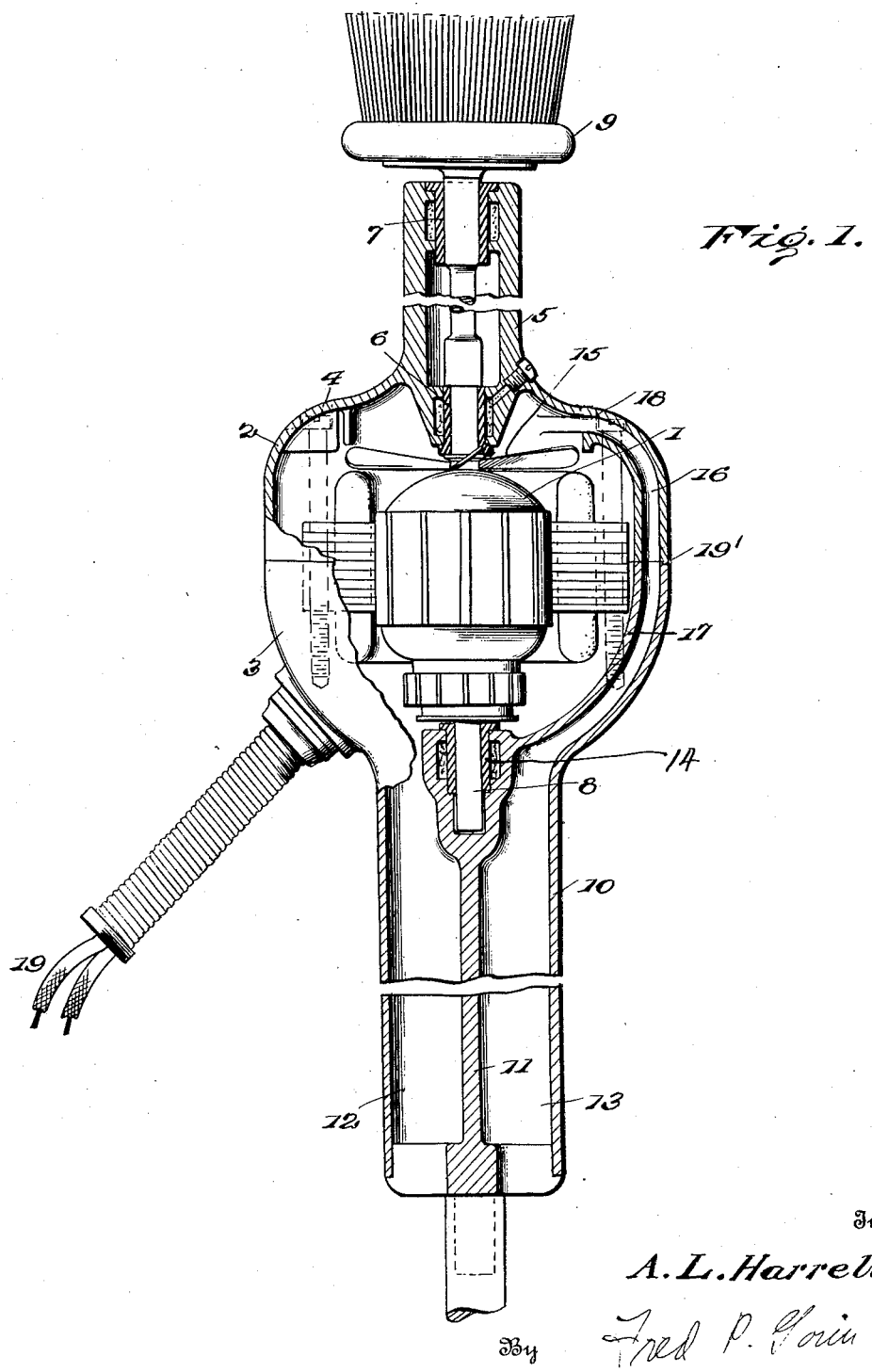
Figure 1 is a view in vertical section showing the improved motor.

The improved motor, indicated generally at 1 is specifically of usual construction, and is mounted within a casing made up of two substantially semi-spherical hollow sections 2 and 3 adapted to be connected together by screws 4, the meeting edges of the sections being formed in any appropriate manner to provide a water tight joint 19'. The section 2 of the casing is provided with a sleeve extension 5, in which in remote bearings 6 and 7 is mounted one end of the armature shaft 8. The bearings 6 and 7, when the armature shaft is in position completely close the extension 5 against the admission of water or the like from the end of the extension. This section of the armature shaft may be extended beyond the bearing 7 and formed to removably receive any appropriate implement as 9.

The remaining section 3 of the casing has a hollow sleeve-like extension 10 in line with the extension 5, but preferably of greater diameter than the latter. The extension 10 is divided by a diametric wall 11 into chambers 12 and 13, that end of the wall 11 next the cylindrical portion of the casing being formed to receive a bearing 14 for the armature shaft 8, On the armature shaft 8 preferably adjacent the bearing 6 is mounted a fan 15, and the casing wall at one side of the motor is formed with a channel 16 which communicates with one of the longitudinal channels of the extension 10, as with channel 13. The channel 16 is preferably formed by a web 17 secured within the respective halves of the casing, and forming when the casing halves are connected a channel which extends around the wall of the casing and opens at one end as at 18 immediately adjacent the fan 15.

The surface conductors for the motor, as 19 are led through a suitable opening in the casing, and the extension 10 is provided with a threaded aperture 20 to receive a threaded stud 21 adapted for hand operation and formed at its inner end to bear upon the armature shaft 8, whereby any desired braking action may be had on said shaft.

As thus constructed it will be apparent that the motor is completely inclosed and protected against the entrance of water, dust or the like, as the motor inclosure is opened only at the extreme end of the extension 10. Furthermore the fan 15 causes a circulation of air within the casing 1, through the channels 13, 16 and 12, as will be apparent.

Claims:

1. A portable hand motor, including a shell in which the motor is mounted, said shell having a tubular extension divided by a longitudinal web into two channels, a fan operated by the motor within the casing remote from said extension, and a fluid channel formed within the casing in communication with one of said first-mentioned channels and opening adjacent the fan.

2. A cylindrical motor casing formed in halves, means for connecting said halves, a tubular extension from one half, a motor mounted within the casing, bearings for the motor shaft arranged in and closing said extension, a tubular extension from the other half of the casing formed to provide spaced channels, a channel formed within the shell communicating with one of said extension channels, and a fan operated by the motor within the casing.

3. A sectional motor casing having opposite extensions, one of said extensions being divided into two channels, a conduit formed within the casing in communication with one of said channels, a motor within said casing, bearings for said motor arranged respectively in said dividing wall and in the remaining extension, and a fan arranged within the casing and operated by the motor.

4. A cylindrical motor casing having opposite tubular extensions, a motor within said casing, a wall dividing one of the extensions into two channels, a channel formed within the casing and in communication with one of said extension channels, said casing channel opening within the casing, and a fan operated by the motor adjacent said channel opening.

5. A sectional motor casing having opposite extensions, one of said extensions being divided into two channels, a conduit formed within the casing in communication with one of said channels, a motor within said casing, bearings for said motor arranged respectively in said dividing wall and in the remaining extension, and a fan arranged within the casing and operated by the motor, and braking means for the motor mounted in one of said extensions.

In testimony whereof I affix my signature.

ANNIE L. HARRELL.